May 15, 1923.
W. H. SCHMIDT
AUTOMATIC VALVE
Filed June 17, 1922
1,455,670
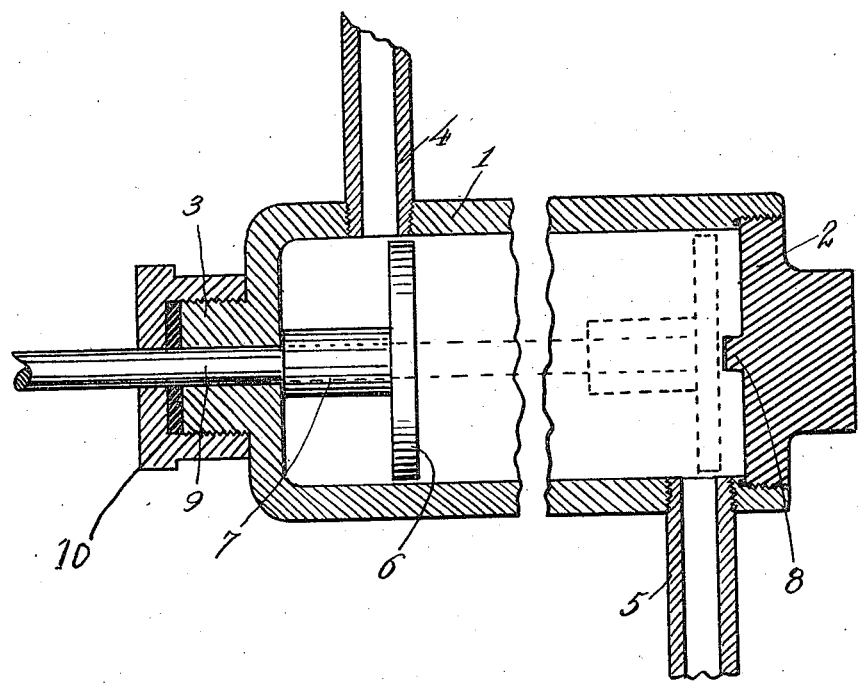
INVENTOR:
William H. Schmidt
BY
ATTORNEYS.

Patented May 15, 1923.

1,455,670

UNITED STATES PATENT OFFICE.

WILLIAM H. SCHMIDT, OF CINCINNATI, OHIO.

AUTOMATIC VALVE.

Application filed June 17, 1922. Serial No. 568,910.

*To all whom it may concern:*

Be it known that I, WILLIAM H. SCHMIDT, a citizen of the United States, and a resident of Cincinnati, in the county of Hamilton and State of Ohio, have invented certain new and useful Improvements in Automatic Valves, of which the following is a full, clear, and exact description, reference being had to the accompanying drawings, forming part of this specification.

My invention relates to automatic valves, such as are employed with hot water heating systems, wherein the act of turning on the water causes the valve to operate the valve of a gas heater so as to turn on the gas. My invention has wide application, however, and may be put to various uses which will suggest themselves to those skilled in the arts.

The object of my invention is to provide a piston valve for a water line, which will act without springs in two directions, one when the water is turned through the piston chamber, and the other when the water is held under a state of static pressure within the piston chamber.

The usual water heater valve is controlled by springs in one direction and flow of water in the other, and thus is distinguished from my valve in which no springs are used. Also my valve is exceedingly simple and very powerful in operation, and can be employed for supplying motor power in connection with a water control valve in place of a gas control valve, such as is familiar in hot water heater practice.

Another advantage of my valve over valves in use in water heater practice is the fact that the piston member thereof does not require packing within its cylinder, and thus does not impart wear to the cylinder. In fact, in my preferred form of device I have clearance between my piston and cylinder, as will be noted below.

I accomplish the objects set forth by that certain construction and arrangement of parts to be hereinafter more specifically pointed out and claimed.

In the drawings, the figure shows in central longitudinal section a simple form of valve constructed according to my invention.

In the form selected for illustration, the cylinder or valve casing is shown at 1 closed by a tight cap 2 at one end and preferably cast so as to provide a sleeve 3 for the piston rod. The inflow water pipe is shown at 4 and the outflow pipe at 5. It will be understood that the pipe 5 in a water heater runs to the service tap and the pipe 4 is connected to the water main.

Within the cylinder is located a piston 6, which, in the form shown, has a clearance of a fraction of an inch all the way around from the inner wall of the cylinder or valve chamber.

A thickened portion of the piston rod at 7 forms a stop for the piston in one direction and a lug 8 forms a stop in the other direction.

The piston rod 9 extends out through the sleeve portion 3 and through suitable packing retained in place by a gland 10.

The position of the lug and the enlarged portion of piston rod is important because the one stops the piston from blocking the inflow pipe and the other permits the piston to pass the outflow pipe but retains a space between the piston and the cylinder or valve chamber head.

The piston rod will be connected to the gas valve in a water heater, or it may be connected to a water valve in the pipe 5 if the device is used as a motor.

In operation when the piston is in the position shown in solid lines in the drawing and the water is turned on, the flow of water will force the piston to the position shown in dotted lines, thereby clearing the outflow valve. When the water is turned off, the piston will travel back to its original position.

The first operation is taken care of by the water flow from the inlet through the outlet pipe, since the clearance around the piston will not take care of the full flow. The return of the piston when the outflow is stopped is due to the fact that the water pressure within the chamber is present all around the piston on all sides, except for that area exposed to atmospheric pressure only through the piston rod.

It can be readily understood that if the piston rod were disconnected from the piston, it would be ejected from the cylinder if water pressure were introduced therein, and the fact that the piston is connected to the rod does not alter the principle whereby the rod by itself would be ejected.

While I have referred to my valve as a water valve, it will be understood that it will operate on air, gas or other fluid or gaseous pressures.

It will also be understood that if the piston rod were to be employed to turn off and on the water, that a constant reciprocation would be provided.

Having thus described my invention, what I claim as new and desire to secure by Letters Patent, is:—

1. A device of the character described, comprising a cylinder, a piston therein, inflow and outflow pipes from said cylinder, means for positively limiting the piston movement in one direction to a point between the two pipes, and in the other direction to a point short of the end of the cylinder but beyond a position to block the flow between the two pipes, and a rod connected to said piston and passing out through the cylinder at the end adjacent the inflow pipe, said piston being so constructed as to permit restricted flow of a medium of pressure past it within the cylinder.

2. A device of the character described, comprising a cylinder having inflow and outflow ports for a medium of pressure, said ports being out of line with each other, and a piston within the cylinder having a portion of its area at all times exposed to low pressure of a medium such as the atmosphere outside of the cylinder, and the cylinder and piston so arranged that the medium of pressure surrounds the balance of the piston at all times, and means for positively limiting the piston movement in the direction of its low pressure exposure to a position lying between the inflow and outflow ports and at its high pressure exposure to a position to unblock the passage between the ports but short of a seat in either end of the cylinder.

3. In combination, a cylinder, a piston therein, a rod on the piston passing through the cylinder, inflow and outflow ports in the cylinder out of line with each other, said piston always located to one side of the cylinder from the inflow port, the cylinder and the piston having clearance at all times, said clearance being sufficient to permit a uniform pressure on all sides of the piston when the flow medium is at rest, but insufficient to permit a full flow of said medium between the ports when the piston is in position between the ports.

4. In combination, a cylinder having inflow and outflow ports out of line with each other, a piston within the cylinder, slightly smaller than the inside of the cylinder, stops to limit the path of the piston in one direction to hold it away from overcoming said clearance in a position to unblock the passage between the ports, and to prevent its passing in the other direction beyond a selected point between the two ports, and a rod connected to the piston and passing out through the cylinder at the inflow port end thereof, said cylinder being closed except for said two ports and the passage for the rod.

WILLIAM H. SCHMIDT.